US010590310B2

(12) United States Patent  
Heucher et al.

(10) Patent No.: US 10,590,310 B2  
(45) Date of Patent: Mar. 17, 2020

(54) ELECTRICAL DEBONDING OF PU HOT MELT ADHESIVES BY USE OF CONDUCTIVE INKS

(71) Applicant: Henkel AG & Co. KGaA, Duesseldorf (DE)

(72) Inventors: Reimar Heucher, Pulheim (DE); Thomas Moeller, Duesseldorf (DE); Siegfried Kopannia, Krefeld (DE); Alasdair Crawford, Hampshire Hook (GB)

(73) Assignee: Henkel AG & Co. KGaA, Duesseldorf (DE)

(*) Notice: Subject to any disclaimer, the term of this patent is extended or adjusted under 35 U.S.C. 154(b) by 0 days.

(21) Appl. No.: 16/046,391

(22) Filed: Jul. 26, 2018

(65) Prior Publication Data

US 2018/0340097 A1 Nov. 29, 2018

Related U.S. Application Data

(63) Continuation of application No. PCT/EP2017/050324, filed on Jan. 9, 2017.

(30) Foreign Application Priority Data

Feb. 1, 2016 (EP) .................... 16153631

(51) Int. Cl.
| | | |
|---|---|---|
| C09J 5/06 | (2006.01) | |
| C09D 11/52 | (2014.01) | |
| C09J 175/04 | (2006.01) | |
| H01B 1/02 | (2006.01) | |
| C09J 11/06 | (2006.01) | |
| C08G 18/10 | (2006.01) | |
| B32B 7/12 | (2006.01) | |
| B32B 43/00 | (2006.01) | |
| C09J 175/02 | (2006.01) | |
| H01B 1/12 | (2006.01) | |
| C08K 5/42 | (2006.01) | |
| C08L 75/04 | (2006.01) | |
| C08K 5/109 | (2006.01) | |
| B32B 37/12 | (2006.01) | |

(52) U.S. Cl.
CPC ...... *C09J 5/06* (2013.01); *B32B 7/12* (2013.01); *B32B 43/006* (2013.01); *C08G 18/10* (2013.01); *C09D 11/52* (2013.01); *C09J 11/06* (2013.01); *C09J 175/02* (2013.01); *C09J 175/04* (2013.01); *H01B 1/02* (2013.01); *H01B 1/122* (2013.01); *B32B 2037/1215* (2013.01); *C08G 2170/20* (2013.01); *C09J 2205/302* (2013.01); *C09J 2475/00* (2013.01); *Y02P 20/582* (2015.11)

(58) Field of Classification Search
USPC ........ 156/247, 307.1, 307.3, 307.5, 701, 711
See application file for complete search history.

(56) References Cited

U.S. PATENT DOCUMENTS

| | | | |
|---|---|---|---|
| 4,171,240 A | 10/1979 | Wong | |
| 4,729,797 A | 3/1988 | Linde et al. | |
| 2008/0196828 A1 | 8/2008 | Gilbert | |
| 2010/0051333 A1* | 3/2010 | Oki | ....... C09D 11/101 174/257 |
| 2014/0374032 A1* | 12/2014 | Heucher | ............ C09J 177/00 156/752 |
| 2016/0009962 A1 | 1/2016 | Yamada et al. | |
| 2018/0320037 A1* | 11/2018 | Franken | ............ C08G 18/12 |

FOREIGN PATENT DOCUMENTS

| | | |
|---|---|---|
| DE | 102012203794 A1 | 9/2013 |
| EP | 1914285 A1 | 4/2008 |
| WO | 0105584 A1 | 1/2001 |
| WO | 2016000222 A1 | 1/2016 |

OTHER PUBLICATIONS

International Search Report for International PCT Patent Application No. PCT/EP2017/050324 dated Jun. 8, 2017.

* cited by examiner

*Primary Examiner* — Sing P Chan  
(74) *Attorney, Agent, or Firm* — James E. Piotrowski

(57) ABSTRACT

The present invention relates to a method for reversibly bonding a first and a second substrate, wherein at least the first substrate is an electrically non-conductive substrate, the method comprising: coating the surface of the electrically non-conductive substrate(s) with a conductive ink; applying an electrically debondable hot melt adhesive composition to the conductive ink-coated surface of the first substrate and/or the second substrate; contacting the first and the second substrates such that the electrically debondable hot melt adhesive composition is interposed between the two substrates; allowing formation of an adhesive bond between the two substrates to provide bonded substrates; and optionally applying a voltage to the bonded substrates whereby adhesion at least one interface between the electrically debondable hot melt adhesive composition and a substrate surface is substantially weakened. Furthermore, the present invention relates to the bonded substrates thus obtained.

16 Claims, No Drawings

ELECTRICAL DEBONDING OF PU HOT MELT ADHESIVES BY USE OF CONDUCTIVE INKS

This application is a continuation of International Application No. PCT/EP2017/050324, filed on Jan. 9, 2017, which claims the benefit of EP Application No. 16153631.3, filed on Feb. 1, 2016.

The present invention relates to a method for forming a reversibly bonded substrate using a hot melt adhesive composition, which at least partially loses its adhesiveness upon application of an electric current and thus allows debonding of substrates that have been bonded using said adhesive. Furthermore, the present invention relates to the bonded substrates thus obtained.

Adhesive bonds are commonly used in the assembly and finishing of manufactured goods. They are used in place of mechanical fasteners, such as screws, bolts and rivets, to provide bonds with reduced machining costs and greater adaptability in the manufacturing process. Adhesive bonds distribute stresses evenly, reduce the possibility of fatigue, and seal the joints from corrosive species.

Hot-melt adhesives are materials or mixtures that undergo a phase change over a narrow temperature range, transitioning between a fluid state at higher temperatures and a crystalline or amorphous solid state at lower temperatures. To form an adhesive bond, the hot-melt is applied to a surface in the molten state or is applied as a solid and subsequently melted on the surface. A second surface is then brought into contact with the adhesive while it is still molten. Upon cooling, the hot-melt hardens, forming an adhesive bond between the two surfaces.

Hot-melt adhesives are particularly advantageous for high-volume, low-cost manufacturing because of the simplicity of applying the adhesive to surfaces for bonding, the rapidity with which the adhesive bond is formed, and because a hot-melt adhesive, while typically a mixture of materials, may be provided as a single component that does not require mixing or the addition of catalysts to initiate the chemical reaction forming an adhesive bond.

To separate the bond formed by a conventional hot-melt adhesive, it is necessary to heat the bond to a temperature above the melting temperature of the adhesive. In practice, however, it is often impractical to apply sufficient heat to a large bonded assembly or to bonded parts that are thermally sensitive. Furthermore, molten adhesives typically retain substantial adhesive properties, such as a high degree of tack, which hinders separation and prevents clean surface separation. Instead, the molten adhesive separates by cohesive failure, leaving behind a stringy residue on the separated surfaces.

The ability to easily separate an adhesive bond, however, provides many benefits. Debonding, i.e., the release of an adhesive bond, may be desired when there is a need to disassemble a temporary structure or a previously bonded assembly of items, e.g., to allow repair, refurbishment, replacement or renovation operations. Simplified disbanding procedures also facilitate end-of-life recycling of materials and components from adhesively bonded goods and structures. Moreover, reversible bonding is beneficial for packaging or for use in securing items during shipping.

The separation strategies that do exist typically involve time-consuming chemical procedures requiring high temperatures and aggressive chemicals. Examples of such techniques are described in U.S. Pat. No. 4,171,240 to Wong and U.S. Pat. No. 4,729,797 to Linde et al. These techniques, although generally effective, are quite harsh and can damage the objects being separated, making them unsuitable for many applications.

To provide materials that are more easily removed from a substrate, the prior art describes adhesives formed from reactive monomers containing linkages susceptible to chemical degradation, e.g., curable resins containing thermally labile linkages or thermally reversible crosslinks. Although these specially prepared materials are more readily cleaved from the substrate, they still require conditions that are harsh to delicate substrates or adjacent adhesive bonds.

Adhesives that are electrically debondable and contain ionic components are known as well as various ionic liquids that can generate conductivity in solids. For example, DE 102012 203 794 A1 describes a hot melt adhesive based on polyamides that contains ionic electrically conductive components that is debondable upon application of an electric current.

However, application of electrically debondable adhesives is typically limited to electrically conductive substrates, specifically metal substrates, as the debonding requires applying an electrical current to the substrate to induce debonding.

Thus, there remains still need in the art for methods that allow to form electrically debondable adhesive bonds also between electrically non-conductive substrates.

The inventors have now surprisingly found that this need can be met by coating the non-conductive substrates with a conductive ink before applying the hot melt adhesive. The thus formed bonded substrates are readily debondable upon application of an electric current due to the conductivity of the ink.

In a first aspect, the present invention thus relates to a method for reversibly bonding a first and a second substrate, wherein at least the first substrate is an electrically non-conductive substrate, the method comprising:
a) coating the surface of the electrically non-conductive substrate(s) with a conductive ink;
b) applying an electrically debondable hot melt adhesive composition to the conductive ink-coated surface of the first substrate and/or the second substrate;
c) contacting the first and the second substrates such that the electrically debondable hot melt adhesive composition is interposed between the two substrates;
d) allowing formation of an adhesive bond between the two substrates to provide bonded substrates; and
e) optionally applying a voltage to the bonded substrates whereby adhesion at least one interface between the electrically debondable hot melt adhesive composition and a substrate surface is substantially weakened.

In another embodiment, the present invention relates to a bonded substrate obtained according to the methods described herein that can be debonded upon application of an electric current and, optionally, heat.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one polyol" means that at least one type of molecule falling within the definition for a polyol is used but that also two or more different molecule types falling within this definition can be present but does not mean that only one molecule of said polyol is present.

If reference is made herein to a molecular weight, this refers to the average number molecular weight $M_n$, if not explicitly stated otherwise. The number average molecular weight $M_n$ can be calculated based on end group analysis (OH numbers according to DIN EN ISO 4629, free NCO content according to EN ISO 11909) or can be determined by gel permeation chromatography according to DIN 55672, in particular DIN 55672-1 with THF as the eluent. If not stated otherwise, all given molecular weights are those determined by gel permeation chromatography according to DIN 55672-1 with THF as the eluent. The weight average molecular weight $M_w$ can be determined by GPC, as described for $M_n$.

If reference is made herein to a free NCO content, this refers to the NCO content as determined according to EN ISO 11909.

All percentages given herein in relation to the compositions or formulations relate to weight % relative to the total weight of the respective composition or formula, if not explicitly stated otherwise.

In various embodiments of the methods described herein, the electrically debondable hot melt adhesive is a polyurethane adhesive comprising at least one polyurethane polymer and at least one organic or inorganic salt. The salt is used as an electrolyte.

Generally, in the debondable compositions of the present invention, an electrolyte serves the purpose to provide sufficient ionic conductivity to the composition to allow the composition to debond from the bonded substrate surface upon applying an electric current. In the compositions described herein, this may be achieved by using a salt that can enable a faradaic reaction at a bond formed between the composition and an electrically conductive substrate surface.

The electrochemically debondable compositions of the invention possess matrix functionality and electrolyte functionality. The electrolyte functionality provides sufficient ionic conductivity to support a faradaic reaction at an electrically conductive substrate in contact with the composition. The matrix functionality of the debondable composition provides the adhesive or coating properties needed for its intended use.

The adhesiveness of the composition is weakened by the application of an electrical potential across the bondline between the composition and at least one surface to which it is bonded. While not wishing to be bound to any particular theory concerning the mode of operation, it is assumed that the faradaic reaction, which takes place at the composition/substrate interface, weakens the bond therebetween. While the faradaic reaction may cause debonding directly, the weakening of the adhesive bond may be the result of an indirect process initiated by the faradaic reaction, in particular the free flow of ions, which destabilizes the morphology of the polymer used to form the adhesive.

According to various embodiments of the present invention matrix functionality is provided by polyurethane polymers such as those typically used in polyurethane hot melt adhesives. The materials may be prepared from commercially available polyurethane polymer resins, often without modification. Accordingly, the terms "polyurethane", "polyurethane polymer" and "polyurethane resin" are used interchangeably herein to relate to polyurethanes, such as those typically used in hot melt applications.

The polyurethane provides the adhesive composition with the necessary adhesive properties, including tack, adhesiveness, cohesiveness, melt characteristics and stability. These basic properties may optionally be controlled by additives and auxiliaries, commonly used and known to those skilled in the art.

The polyurethanes are the reaction products of a polyol and a polyisocyanate having an isocyanate functionality of about 2 or more. The polyurethanes may be NCO-terminated polyurethanes that are obtained by reacting polyols with a molar excess of polyisocyanates, wherein "molar excess" refers to the molar ratio of isocyanate groups (—NCO groups) to hydroxyl groups (—OH groups).

In various embodiments, the polyols used for the production of the polyurethanes may be selected from those typically used in the field, including, without limitation, polyether polyols, polyester polyols, polycarbonates, and mixtures thereof.

Polyester polyols include those that are obtainable by reacting, in a polycondensation reaction, dicarboxylic acids with polyols. The dicarboxylic acids may be aliphatic, cycloaliphatic or aromatic and/or their derivatives such as anhydrides, esters or acid chlorides. Specific examples of these are succinic acid, glutaric acid, adipic acid, pimelic acid, suberic acid, azelaic acid or sebacic acid, phthalic acid, isophthalic acid, trimellitic acid, phthalic acid anhydride, tetrahydrophthalic acid anhydride, glutaric acid anhydride, maleic acid, maleic acid anhydride, fumaric acid, dimeric fatty acid and dimethyl terephthalate. Examples of suitable polyols are monoethylene glycol, 1,2-propanediol, 1,3-propanediol, 1,4-butanediol, 3-methylpentane-1,5-diol, neopentyl glycol (2,2-dimethyl-1,3-propanediol), 1,6-hexanediol, 1,8-otaneglycol cyclohexanedimethanol, 2-methylpropane-1,3-diol, dithyleneglycol, triethyleneglycol, tetraethyleneglycol, polyethyleneglycol, dipropyleneglycol, polypropyleneglycol, polypropyleneglycol, dibutyleneglycol and polybutyleneglycol. Alternatively, they may be obtained by ring-opening polymerization of cyclic esters, preferably ε-caprolactone.

In various embodiments, the polyester polyol has a melting temperature $T_m > 0°$ C., preferably $>40°$ C. and/or has an average number molecular weight $M_n$ in the range of 400 to 5000, preferably 400 to 3000 g/mol, more preferably 800-2500 g/mol, most preferably 1000 to 2000 g/mol.

Polyether polyols include polyalkylene glycol homo- or copolymers, in particular polypropylene glycol homo- or copolymers, polyethylene glycol homo- or copolymers, polytetramethylene glycol homo- or copolymers, or polypropylenglycol/polyethyleneglycol block copolymers.

In various embodiments, the polyether polyol has an average number molecular weight of 1000 to 4000, preferably 1000 to 3000 g/mol.

Suitable polycarbonates can be obtained by reaction of carbon acid derivatives, e.g. diphenyl carbonate, dimethyl carbonate or phosgene with diols. Suitable examples of such diols include ethylene glycol, 1,2- and 1,3-propanediol, 1,3- and 1,4-butanediol, 1,6-hexanediol, 1,8-octanediol, neopentyl glycol, 1,4-bishydroxymethyl cyclohexane, 2-methyl-1,3-pro-panediol, 2,2,4-trimethyl pentanediol-1,3, dipropylene glycol, polypropylene glycols, dibutylene glycol, polybutylene glycols, bisphenol A, tetrabromobisphenol A as well as lactone-modified diols. The diol component preferably contains 40 to 100 wt. % hexanediol, preferably 1,6-hexanediol and/or hexanediol derivatives. More preferably the diol component includes examples that in addition to terminal OH groups display ether or ester groups.

The hydroxyl polycarbonates should be substantially linear. However, they can optionally be slightly branched by the incorporation of polyfunctional components, in particular low-molecular polyols. Suitable examples include glycerol, trimethylol propane, hexanetriol-1,2,6, butanetriol-1,2, 4, trimethylol propane, pentaerythritol, quinitol, mannitol, and sorbitol, methyl glycoside, 1,3,4,6-dianhydrohexites.

Suitable polycarbonate polyols are, without limitation, those obtainable under the trademark names Desmophen® C3200 (Bayer) and Kuraray® C2050 (Poly-(3-methyl-1,5-pentanediol, 1,6-hexanediol)carbonate; Kuraray).

In addition further polyols, in particular diols, may be used in combination with the above. Such diols may be monomeric diols, such as 1,4-butanediol.

Suitable polyols further comprise polyols that are hydroxy-functionalized polymers, for example hydroxy-functionalized siloxanes as well as polyols that comprise additional functional groups, such as vinyl or amino groups.

For use as the polyisocyanate any compound which includes at least two isocyanate groups is within the contemplation of the present invention. It is preferable, however, that the polyisocyanate be a diisocyanate. The incorporation of small amounts of isocyanate with a functionality higher than two, in particular a triisocyanate, is also contemplated and may under certain circumstances even be advantageous. Such polyisocyanates can act as cross-linkers. In this case where the polyisocyanate acts as a cross-linker, polyisocyanates based on hexamethylene diisocyanate are preferred. Suitable diisocyanates include, without limitation, methylenediphenyl diisocyanate (MDI), toluene-2,4-diisocyanate (TDI), hexamethylene diisocyanate (HDI), polymeric diphenylmethane diisocyanate (PMDI), isophorone diisocyanate (IPDI), methylene-4,4-bis(cyclohexyl)diisocyanate (H12MDI) and mixtures thereof. Although both aliphatic and aromatic polyisocyanates are within the contemplation of the present invention, it is preferred that the polyisocyanate be an aliphatic polyisocyanate. Thus, in a particularly preferred embodiment, the polyisocyanate is an aliphatic diisocyanate. Among particularly preferred aliphatic diisocyanates are isophorone diisocyanate, hexamethylene diisocyanate, and mixtures thereof. Suitable polyisocyanates are, for example, commercially available under the trademark name Desmodur® from Bayer AG (DE).

The polyisocyanate can be used in molar excess relative to the OH groups of all polyols used to yield an NCO-terminated polyurethane.

The polyurethane may also be a hybrid polymer and may, in addition to the urethane units, comprises additional polymeric units, such as acrylates, siloxanes and the like.

Generally, the components used for synthesis of the polyurethane are selected such that meltable, non-cross-linked products are obtained. The type of polyols and isocyanates used, in particular the polyols used, are decisive for the melting behavior and the viscosity of the molten polymer.

In various embodiments, the molecular weight $M_w$ of the polyurethane is between 10000 and 250000 g/mol, in particular up to 150000 g/mol.

In the molten state, the polyurethane should have a viscosity of between 500 and 100000 mPas (as measured at 220° C., Brookfield Thermosel RVT, EN ISO 2555), preferably up to 50000 mPas, more preferably 1000 to 10000 mPas. The melting point of a suitable polyurethane should preferably be from 70° C. to 220° C., more preferably from 100° C. to 210° C. in particular from 140° C. to 200° C. As used herein, the melting point refers to a value measured by differential scanning calorimeter (DSC) according to ISO 11357, in particular ISO 11357-3, if not stated otherwise.

In various embodiments, the polyurethane is used in amounts of about 20 to about 90% by weight of the adhesive composition, preferably 40 to 90% by weight.

The polyurethanes can be combined with commonly known additives and auxiliaries to prepare the hot melt adhesives. These include, without limitation, plasticizers, adhesion promoters, pigments, corrosion inhibitors, leveling agents, gloss promoters, stability enhancers, anti-foaming agents, antioxidants and fillers. The hot melt may further include particles of a non-conducting material, e.g., crushed glass or plastic beads, to prevent conductive surfaces used from contacting each other in the debonding process and forming a short circuit. Other additives will be apparent to those skilled in the art and are within the scope of the invention.

The hot melt composition may further comprise additional polymers that are suited for hot melt applications, including polyamides, polyacrylates and polyesters. However, if these are used, they are used in amounts of only up to 30% by weight relative to the amount of the polyurethane.

The above polymers are well suited to provide the matrix functionality of the composition. However, in order to support a faradaic reaction at an electrically conductive substrate, the debonding composition also must possess sufficient ion conductivity to permit ion transport. Therefore, the electrically debondable adhesive composition typically further includes a salt to provide the electrolyte functionality of the debondable adhesive composition. The salts can be solid or liquid at room temperature (25° C.), i.e. the salts include solid salts as well as the so-called ionic liquids.

The salts may be dissolved or dispersed in the polyurethane or they may be associated with polymer groups.

In the following, ionic or neutral compounds are enumerated, but it should be understood that this refers to the corresponding ionic structures present in the salts. It is also possible that said salts contain water of crystallization in bound form.

For example, salts of organic acids may be used, such as, for example, Li, Na or K salts of aliphatic $C_{2-6}$ mono- or di-carboxylic acids, aromatic mono- or di-carboxylic acids, and trifluoromethane sulfonic acids. In one embodiment, a quaternary organic compounds are used as a cation, with the anion being the afore-mentioned acid anions or halides. A further preferred embodiment uses as an anion organic compounds containing sulfonate groups, for example, trifluoromethanesulfonate, either in form of cyclic structures, such as acesulfames or saccharinates, or linear structures, such as bis(trifluoromethane sulfonyl)imide or trifluoromethane carbonyl-trifluoromethane sulfonyl imide.

Cationic quaternary organic compounds that may be used include, without limitation, tetraalkylphosphonium, trialkylsulfonium, tetraalkylammonium, $N^+$-alkyl-substituted cyclic 5- or 6-membered ring amines, $N^+$-alkyl substituted aromatic 5-membered ring imidazolines, wherein the alkyl group may be a linear aliphatic alkyl radical with 1 to 12 carbon atoms. The alkyl radicals may be the same or different and can optionally also be substituted with an OH group.

In principle, the various anions and cations can be combined with each other as long as the compounds obtained have salt-like properties. In a preferred embodiment, the salt-like compound should have a melting point above 40° C.

Examples of suitable cationic groups include, without limitation, tetraalkyl-substituted N-compounds, such as N-tetrabutyl-ammonium, N-trimethyl-N-butyl ammonium, N-triethyl-N-benzylammonium, N,N-dimethyl-cyclohexylamine, N-methyl-N-trioctylammonium; OH-functionalized tetraalkylamines, such as trimethyl-hydroxyethylammonium (choline), acetylcholine, N-methyl-N-hydroxyethyl-cyclohexylamine; Trialkyl-substituted S-compounds, such as triethylsulfonium, trimethylsulfonium; 5-membered N-heterocycles, such as N-alkyl imidazolium derivatives, such as 1-methyl-3-ethyl-imidazolium, 1-ethyl-3-methyl-imidazolium, 1-butyl-3-methylimidazolium, 1-hexadecyl-3 methyl-imidazolium, 1-methyl-3-octyl-imidazolium, 1-methyl-3-nonyl-imidazolium, 1-heptyl-3-methyl-imidazolium, 1-ethyl-2-methyl-imidazolium, 1-propyl-4-methyl-imidazolium, 1-propyl-2-methyl-imidazolium, 1,2-dimethyl-3-propyl-imidazolium; 6-membered N-heterocycles, for example, alkyl-substituted pyridinium, pyrrolidinium, or piperidinium compounds, such as 1-butyl-pyridinium, 1-butyl-3-methyl-pyridinium, 1-butyl-4-methyl-pyridinium, 1-propyl-3-methyl-pyridinium, 1-butyl-3-propyl-piperidinium, 1-butyl-1-methylpyrrolidinium, 1-butyl-3-methyl-pyrrolidinium, 1-hexyl-3-methyl-pyrrolidinium, and the like.

It is preferable for some applications to avoid halides as anions. Examples of suitable anions include, without limitation, tetrafluoroborate, trifluoromethane sulfonate, aromatic dicarboxylates such as phthalic acid and its isomers, sulfonate group containing e compounds, such acesulfams, saccharinates, bis(trifluoromethane sulfonyl)imide or trifluoromethane carbonyl-trifluoromethane sulfonyl imide.

Preferred are trifluoromethane sulfonate salts, in particular the alkali metal salts, more particular lithium trifluoromethane sulfonate.

The salt is included in the debondable adhesive composition in an amount sufficient to provide the requisite ionic conductivity to support the faradaic reaction of the debonding process. The actual amount of salt used in a particular composition is dependent on the ionic conductivity of the polymer and the ability of the salt to form a continuous conductive pathway within the composition. While a continuous pathway is not absolutely required, it promotes the efficiency of the process. Where ions are required to tunnel through regions of higher resistance, higher voltages and longer times are required for debonding.

In the adhesive compositions according to the present invention, the at least one salt is typically used in an amount of 1-30%, preferably in an amount of 1-16% per weight of the adhesive composition.

As a further component, the hot melt adhesive composition comprise at least one polar compound. Such polar compounds can promote miscibility with the salts and herein are also referred to as "solvating matrix". The polar compounds can include polymers, such as polyphosphazenes, polymethylenesulfides, polyoxyalkylene glycols, polyethylene imines and the like. Also suitable are low molecular weight polyols. These compounds may be solid or liquid at room temperature (25° C.), but are preferably liquid.

A group of suitable polar compounds include low molecular weight aliphatic polyols with 2 to 120 hydroxyl groups. These typically have a molecular weight of up to 1000 g/mol, preferably up to 500 g/mol. Preferred are those having 3 to 6 OH groups. Examples include, without limitation, neopentyl glycol, pentaerythritol, glycerol, monosaccharides and sugar alcohols, such as glucose, arabinose, xylose, mannitol, sorbitol, arabinose and other multiple OH-groups containing compounds.

Particularly suitable are polyethers, in particular polyethylene glycols and polypropylene glycols having 2 to 4 OH groups or NH groups, such as for example PEG-bis(2EH) (polyethylene glycol-bis(2-ethylhexanoate)). Such polyethers are commercially available. Particularly suitable are polyether polyols with a molecular weight below 10,000 g/mol preferably from 350 to 5000 g/mol. These polyethers may be solid or liquid.

In preferred embodiments, the polar compounds are cyclic carbonates, such as ethylene carbonate and propylene carbonate.

In a preferred embodiment according to the present invention, the solvating matrix is formed by propylene carbonate or ethylene carbonate and the salt is lithium trifluoromethanesulfonate.

In another preferred embodiment, the solvating matrix is formed by poly(ethylene glycol)bis(2-ethylhexanoate) and the salt is lithium trifluoromethanesulfonate.

The polar compounds may be used individually or in combination. In various embodiments, the polar compounds used are liquid at room temperature (and 1013 mbar) or have a melting temperature below the melting temperature of the adhesive, preferably below 100° C., more preferably below 80° C., even more preferably below 60° C.

The polar compounds can be used in amounts from 0 to 25% by weight, preferably 5 to 15% by weight, based on the total weight of the hot melt adhesive.

The electrolyte functionality of the debondable composition provides ionic conductivity sufficient to maintain a faradaic reaction at an interface with an electrically conductive surface. Sufficient conductivity may be readily established by preparing a composition and applying a voltage across a bondline with an electrically conductive substrate surface. If current flow is observed, a faradaic reaction at the bondline may be assumed. Sufficient ionic conductivity also may be empirically observed by applying a voltage across the bondline and noting whether the bond is weakened. Compositions with ionic conductivities in the range of $10^{-11}$ to $10^{-5}$ S/m at room-temperature are considered within the scope of the invention. Materials having higher ionic conductivities generally require shorter debonding times. Compositions with ionic conductivities in the range of $10^{-9}$ to $10^{-7}$ S/m at room-temperature are preferred.

Methods for producing an electrically debondable hot melt polyurethane adhesive composition as described herein are known in the art. Such methods may include adding additives and auxiliaries to the polyurethane in molten state using the known devices, such as static mixers, dissolvers, kneaders and extruders. The adhesive is then cooled and can be stored. In various embodiments according to the present invention, the method comprises blending of a polyurethane hot melt with the salt and optionally one or more additives, wherein the blending is performed at increased temperatures to keep the composition in the molten state.

A bonded substrate may be obtained by disposing a debondable composition as described herein between two or more surfaces of two or more substrates such that the composition forms an adhesive bond to each surface and holds each surface in a generally fixed position relative to the other surface or surfaces while maintaining those positions in response to a force equal to at least the weight of the lightest bonded element.

The adhesive compositions described herein can be applied as hot melt adhesives. They are melted at temperatures of from 30 to 220° C., preferably from 40 to 150° C., more preferably from 80 to 110° C., and then applied in a flowable state to a substrate. The viscosity of a hot melt adhesive as described herein may range from 500 to 25,000 mPas (as measured at 220° C., Brookfield Thermosel RVT, EN ISO 2555) at an application temperature of from 30 to 220° C., preferably from 40 to 150° C., more preferably from 50 to 120° C., e.g. 100° C. The viscosity can be adapted to the method of application, it is known to reduce a high viscosity by raising the temperature. Immediately afterwards, the second substrate is pressed against the adhesive layer and, after cooling, a physical adhesive bond is formed. Those skilled in the art are familiar with devices for melting and application of hot melt adhesives. The thickness of the adhesive layer is also known to the skilled person, and it can be chosen based on his technical knowledge and the desired application. The layer thickness is usually from 5 to 1000 µm, in particular from 10 to 500 µm. After cooling, the solidified layer provides the adhesive bond. The adhesive layers may be amorphous, but they may also have crystalline constituents.

At least one of the substrates to which a hot melt adhesive composition may be applied according to the described methods is an electrically non-conductive substrate and may be any type of electrically non-conductive material, including plastics, glass, ceramics and other substrates. They may be solid and rigid but in other embodiments, flexible substrates, such as one layer or multilayer films may be used for bonding. The other substrate may be electrically conductive, for example be made of or coated with a metal, or in other embodiments may also be an electrically non-conductive substrate. Accordingly, the two substrates may be made of the same or of different materials. "Electrically non-conductive", as used herein in relation to the substrate, relates to a conductivity of said material that is equal to or below $10^{-8}$ S·m$^{-1}$ under standard conditions (20° C., 1013 mbar). According to the methods of the inventions, the surfaces of all electrically non-conductive substrates are coated with a conductive ink in order to render it sufficiently conductive before application of the hot melt adhesive.

As it is necessary that the substrates used for bonding have an electrically conductive surface such that an electric current may be applied in order to weaken the bond formed by the adhesive composition, in the methods described herein the electrically non-conductive substrate(s) to be bonded is/are coated with a conductive ink. Suitable conductive inks are well-known in the art and include inks that include elements selected from, without limitation, Ag, Cu, Al, W, Fe, Pt, Mn, Pb, Hg, Ni, Cr, C, Ge, Si or a combination thereof. Suitable conductive inks are, for example, described in patent publications U.S. Pat. Nos. 7,037,447, 6,322,620, WO 2013/036519 and U.S. Pat. No. 8,158,032. Particularly preferred are metal-based conductive inks, including elements selected from Ag, Cu, Al, W, Fe, PT, Mn, Pb, Hg, Ni and Cr, more preferably Ag, Cu, Fe, and Pt. Most preferred are silver-based conductive inks, for example those that are commercially available under the tradename Loctite ECI 1006 E&C (Henkel AG & Co KgaA).

In various embodiments, the ink is coated onto the substrate surface with a thickness of between 0.001 µm and 10000 µm, preferably between 0.01 µm and 1000 µm.

The debonding according to the invention can be achieved by applying an electric voltage to the bonded substrates. For this purpose, typically perpendicular to the adhesive layer, that is to say in the direction from one substrate to another substrate, an electrical voltage is applied. The voltage typically ranges from 0.1 to 240 V, preferably 9-100 V, especially 9-48 V. Particularly suitable is a DC voltage.

After a certain reaction time, the two substrates can be detached from each other by at normal traction or lateral shearing. The speed of adhesion loss can be influenced by the amount and type of salts. If a fast separation is desired, for example 10 to 60 sec., the amount can be increased. If a fast loss of adhesion is not desired, for example 2 to 5 min, a lesser amount is sufficient. Typically, the time period for which the voltage is applied, may range from <1 second to >20 minutes, in particular from <1 second to <5 minutes, more preferably from 1 second to 3 minutes.

The debonding of the adhesive composition and the surfaces according to the present invention may be triggered by only one stimulus, this stimulus being an electrical stimulus. Exposure to said electrical current may be conducted at ambient temperatures, that is, for example, at room temperature around 20° C. Additionally, in order to facilitate the debonding process, a second stimulus may be applied. This second stimulus may be heat. The combination of an electrical current and elevated temperatures results in even easier debonding. However, heat exposure is optional.

Accordingly, in various other embodiments, the adhesive layer may additionally be heated for the debonding. In particular, heating at up to 80° C. is advantageous, in particular from 35 to 70° C. This temperature is not sufficient to make the adhesive flowable, but together with the applied voltage only leads to a loss of adhesion. The increased temperature may also affect the polar compounds if they are used and have melting temperatures within this temperature range. The melting of the polar compounds may support the debonding process. This is referred to as dual trigger debonding, while the application of voltage alone is referred to as single trigger debonding.

Methods for heating the substrates and/or adhesive layer for debonding are known to those skilled in the art and include, without limitation, hot gas exposure, such as hot air exposure, and exposure to radiation sources, such as IR or NIR radiation. It is also possible to heat the adhesive layer by ultrasound.

The present invention also encompasses the reversibly bonded substrates obtained according to the methods disclosed herein. These typically include two substrates, one or both of which are coated with a conductive ink, and an adhesive layer between the ink-coated surfaces of said substrates that forms the bonding. The inks, substrates and adhesive compositions may be those described herein.

The methods and substrates described herein can be used in various fields, but are preferably used in the manufacture of electronic devices. The use of debondable adhesives allows the simple recycling of bonded substrates.

It is understood that all embodiments disclosed herein in relation to the methods are similarly applicable to the bonded substrates.

The following examples are given to illustrate the present invention. Because these examples are given for illustrative purposes only, the invention should not be deemed limited thereto.

EXAMPLES

Example 1

A polyurethane hot melt comprising an isocyanate-functional polyurethane polymer with a free NCO content of ca. 1.8% containing 15 wt. % additive 1, as defined below, was applied between one glass substrate and a stainless steel substrate to form a composite. One side of the glass substrate was either (i) coated with a silver (Ag)-containing ink (Loctite ECI 1006 E&C from Henkel) at a thickness of about 7 µm, or (ii) uncoated.

Additive 1=

30 wt % lithium trifluoromethanesulfonate ($CF_3SO_3Li$)

70 wt % 4-Methyl-1,3-dioxolan-2-one (propylene carbonate) ($C_4H_6O_3$)

Upon introduction of 48 V current at 25° C. and 1 atm for 5 minutes, adhesive failure was observed with bond strengths of 0.24 MPa (control (average of 3 measurements without application of electrical current)=2.80 MPa) for the silver ink coated glass substrate. For the uncoated glass substrate adhesive failure was observed with bond strengths of 5.14 MPa (average of 3 measurements without application of electrical current).

The invention claimed is:

1. A method for reversibly bonding a first and a second substrate, wherein at least the first substrate is an electrically non-conductive substrate, the method comprising:
   a. coating the surface of the electrically non-conductive substrate(s) with a conductive ink;
   b. applying an electrically debondable hot melt adhesive composition to the conductive ink-coated surface of the first substrate and/or the second substrate, wherein the electrically debondable hot melt adhesive composition comprises an NCO-terminated polyurethane polymer;
   c. contacting the first and the second substrates such that the electrically debondable hot melt adhesive composition is interposed between the two substrates;
   d. allowing formation of an adhesive bond between the two substrates to provide bonded substrates; and
   e. optionally applying a voltage to the bonded substrates whereby adhesion between the electrically debondable hot melt adhesive composition and the substrate surface is substantially weakened.

2. The method according to claim 1, wherein the electrically debondable hot melt adhesive composition is an electrically debondable hot melt polyurethane adhesive composition comprising at least one polyurethane polymer and at least one organic or inorganic salt.

3. The method according to claim 1, wherein
   the voltage applied ranges from 0.1 to 240 V; and/or
   the voltage is applied for an interval of <1 second to >20 minutes.

4. The method according to claim 1, wherein step e) is present and further includes heating the bonded substrates to a temperature from 35° C. to 80° C.

5. The method according to claim 1, wherein the electrically debondable hot melt adhesive composition is an electrically debondable hot melt polyurethane adhesive composition comprising 20 to 90% by weight of the adhesive composition of at least one polyurethane polymer.

6. The method according to claim 1, wherein the electrically debondable hot melt adhesive composition is an electrically debondable hot melt polyurethane adhesive composition comprising 1 to 30% by weight of the adhesive composition of at least one organic or inorganic salt.

7. The method according to claim 1, wherein the electrically debondable hot melt adhesive composition comprises at least one polar compound.

8. The method according to claim 1, wherein the electrically debondable hot melt adhesive composition comprises at least one polar compound selected from the group consisting of polyphosphazenes, polymethylenesulfides, polyoxyalkylene glycols, polyethylene imines, low molecular weight polyols, polyethers and cyclic carbonates.

9. The method according to claim 1, wherein the electrically debondable hot melt adhesive composition comprises at least one polar compound, the polar compound being present in an amount of 1 to 30% by weight of the adhesive composition.

10. The method according to claim 1, wherein the electrically debondable hot melt adhesive composition comprises a trifluoromethanesulfonate salt.

11. The method according to claim 1, wherein the electrically debondable hot melt adhesive composition comprises lithium trifluoromethanesulfonate.

12. The method according to claim 1, wherein the NCO-terminated polyurethane polymer has a free NCO content of 0.1 to 5%.

13. The method according to claim 1, wherein the conductive ink:
   a. comprises an element selected from the group consisting of Ag, Cu, Al, W, Fe, Pt, Mn, Pb, Hg, Ni, Cr, C, Ge, Si, and any combination thereof; and/or
   b. is coated onto the substrate surface with a thickness of between 0.001 µm and 10000 µm.

14. The method according to claim 13, wherein the conductive ink is coated onto the substrate surface with a thickness of between 0.01 µm and 1000 µm.

15. Bonded first and second substrates obtained by the method of claim 1, wherein the bonded first and second substrates can be debonded upon application of an electric current and, optionally heat.

16. The method according to claim 1, wherein the electrically debondable hot melt adhesive composition comprises at least one polar compound selected from the group consisting of propylene carbonate and poly(ethylene glycol) bis(2-ethylhexanoate).

* * * * *